US011729354B2

(12) United States Patent
Springer

(10) Patent No.: US 11,729,354 B2
(45) Date of Patent: Aug. 15, 2023

(54) REMOTELY ADJUSTING AUDIO CAPTURE DURING VIDEO CONFERENCES

(71) Applicant: Zoom Video Communications, Inc., San Jose, CA (US)

(72) Inventor: Shane Springer, Manchester, MI (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/514,818

(22) Filed: Oct. 29, 2021

(65) Prior Publication Data

US 2023/0133265 A1    May 4, 2023

(51) Int. Cl.
*H04N 7/15* (2006.01)
*H04R 3/00* (2006.01)
*H04R 1/40* (2006.01)
*G06V 10/22* (2022.01)
*G06V 20/40* (2022.01)

(52) U.S. Cl.
CPC ............ *H04N 7/15* (2013.01); *G06V 10/235* (2022.01); *G06V 20/41* (2022.01); *H04R 1/406* (2013.01); *H04R 3/005* (2013.01)

(58) Field of Classification Search
CPC ............ H04N 7/15; H04N 7/147; G06K 9/00; G06K 9/20; H04R 1/40; H04R 3/00
USPC .......................................... 348/14.01–14.16
See application file for complete search history.

(56) References Cited

U.S. PATENT DOCUMENTS

| 10,349,009 B1 * | 7/2019 | Natarajan ................ H04N 7/15 |
| 2018/0013982 A1 * | 1/2018 | Mann .................. H04N 21/2143 |
| 2019/0313187 A1 * | 10/2019 | Stoltze ................ G10L 21/0232 |

* cited by examiner

*Primary Examiner* — Melur Ramakrishnaiah
(74) *Attorney, Agent, or Firm* — Kilpatrick Townsend & Stockton LLP

(57) ABSTRACT

One example method includes joining, by a first client device, a videoconferencing meeting hosted by a video conference provider, the videoconference meeting including a plurality of participants; providing an audio stream and a video stream to a video conference provider; receiving, from a second client device, an audio focus area associated with a video stream provided the first client device; determining, based on the audio focus area, a bounding region within an environment shown in the video stream; directing a microphone array to capture audio from the bounding region; and providing the captured audio as an audio stream to the video conference provider.

20 Claims, 15 Drawing Sheets

REMOTELY ADJUSTING AUDIO CAPTURE DURING VIDEO CONFERENCES

FIELD

The present application generally relates to video conferencing and more particularly to remotely adjusting audio capture during video conferences.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
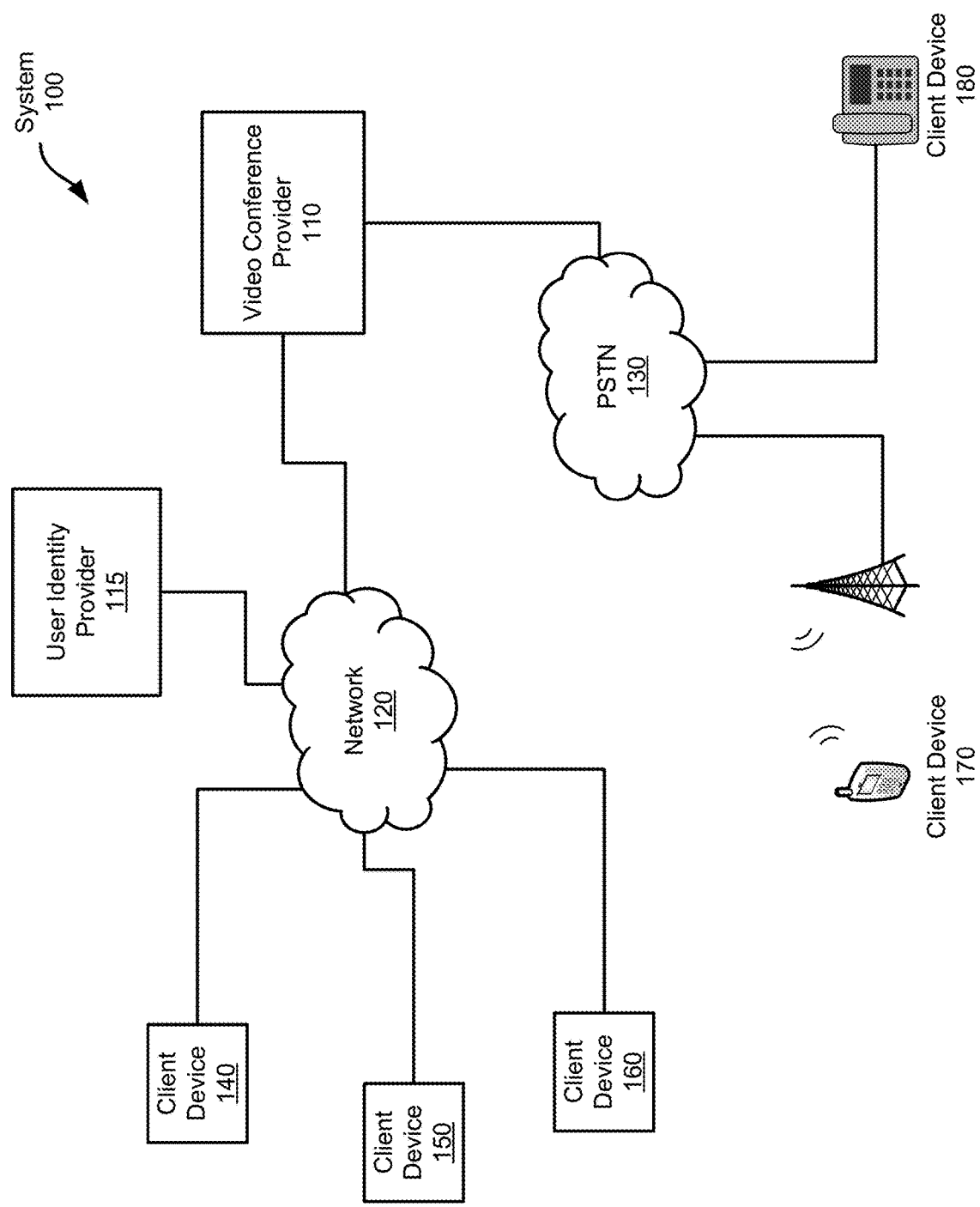
FIGS. 1-2 show example systems for remotely adjusting audio capture during video conferences.

Examples are described herein in the context of remotely adjusting audio capture during video conferences. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

People participate in video conferences for a wide variety of reasons, such as to keep in touch with family, conduct business, or manage groups or organizations. Frequently, people attend video conferences using their own personal client device, such as a desktop or laptop computer, tablet, or smartphone. However, in some cases, multiple people in a conference room (or other common space) may join a video conference using a common camera and microphone or set of microphones.

During the video conference, different people within the conference room may speak. This audio is picked up by the available microphones and provided to the other participants in the video conference. However, unlike participants that are using their own personal device who can readily position their microphones to capture high quality audio, participants in larger group settings may not be able to position themselves optimally with respect to the available microphone(s). Similarly, if multiple people in the same location are speaking at the same time, it can be difficult for other participants to differentiate the audio between the multiple speakers. Thus, other participants in the video conference may feel left out of discussions happening at the common location or may simply be unable to understand what is being said. Further, other sources of audio, like disturbances outside the room, ambient noise, etc. may also degrade the audio provided from the microphones in the common location.

To improve the quality of audio in such settings, participants in the video conference may interact with their video conferencing application to identify a region or regions within another video stream that they would like to obtain clear audio from. To do so, they may use their mouse cursor to draw a box or other shape around the area in a particular video stream, or may draw such a shape on a touchscreen to identify the area. Once they have selected an area, the video conferencing software provides that selected area to the client device providing the video stream.

The receiving client device obtains the selected area and, using pre-programmed information about the size and shape of the room and the location of the camera that is providing the video stream, determines where in the room the selected area corresponds to. Once the region in the room is determined, the client device adjusts a microphone or microphone array so that it is directed to receive audio from that region. For example, a microphone or microphone array may be physically moved, such as by rotating the microphone or one or more microphones in the array. In some cases, a microphone array may employ beamforming techniques to capture audio, and so beamforming parameters may be adjusted to target the selected region. Once the microphone or microphone array has been adjusted, the captured audio from the ROI is provided to the requesting device as focused audio.

In some cases, a larger conference room may have multiple microphone arrays, which may allow multiple different participants to focus on different regions within the room, or it may allow a single participant to focus on multiple different regions. Such techniques may allow participants in the video conference to more readily hear and understand other participants, even when those participants are in a crowded or noisy environment.

This illustrative example is given to introduce the reader to the general subject matter discussed herein and the disclosure is not limited to this example. The following sections describe various additional non-limiting examples and examples of remotely adjusting audio capture during video conferences.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
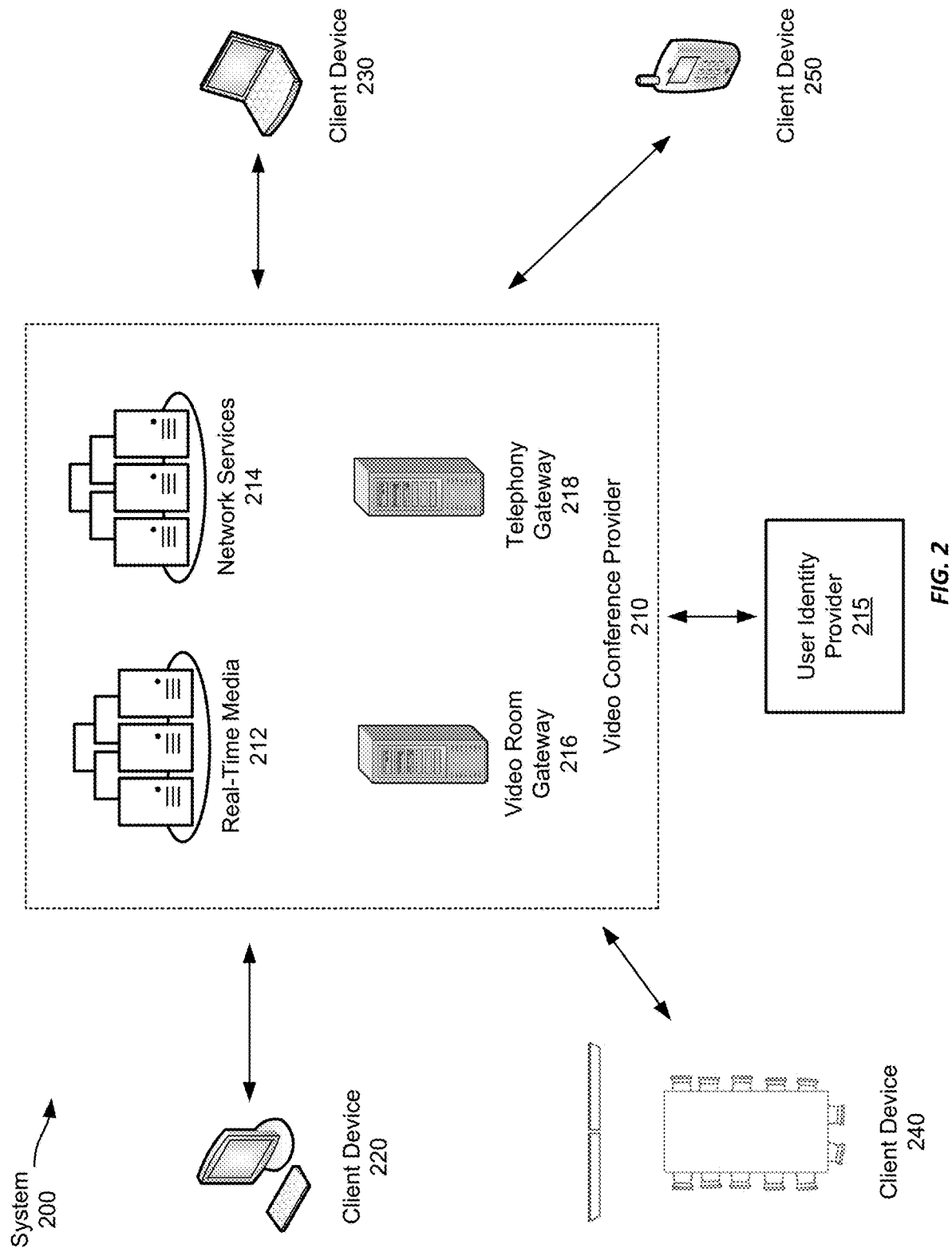

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio streams when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3A:
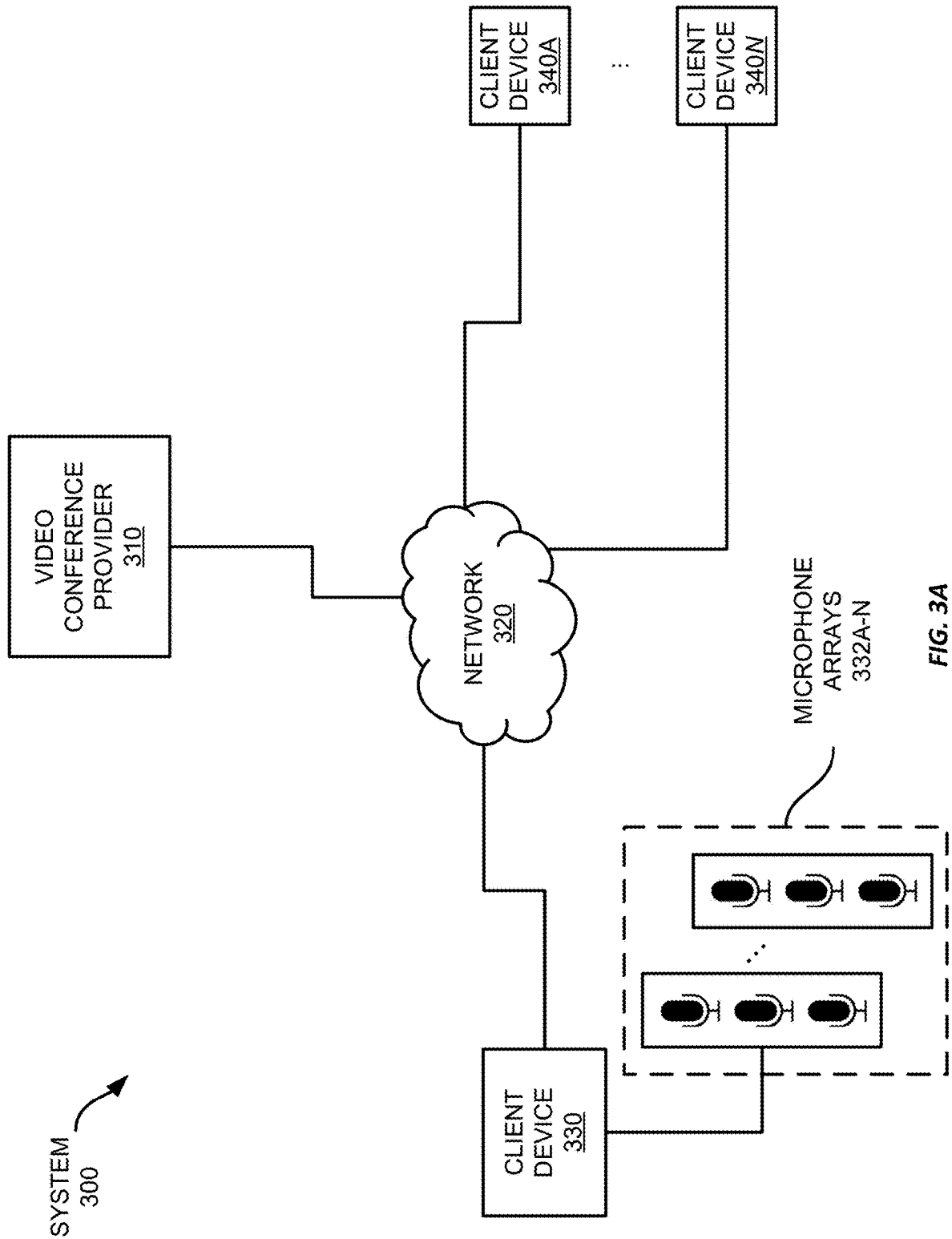
FIGS. 3A-3B show an example system remotely adjusting audio capture during video conferences.
Figure 3B:
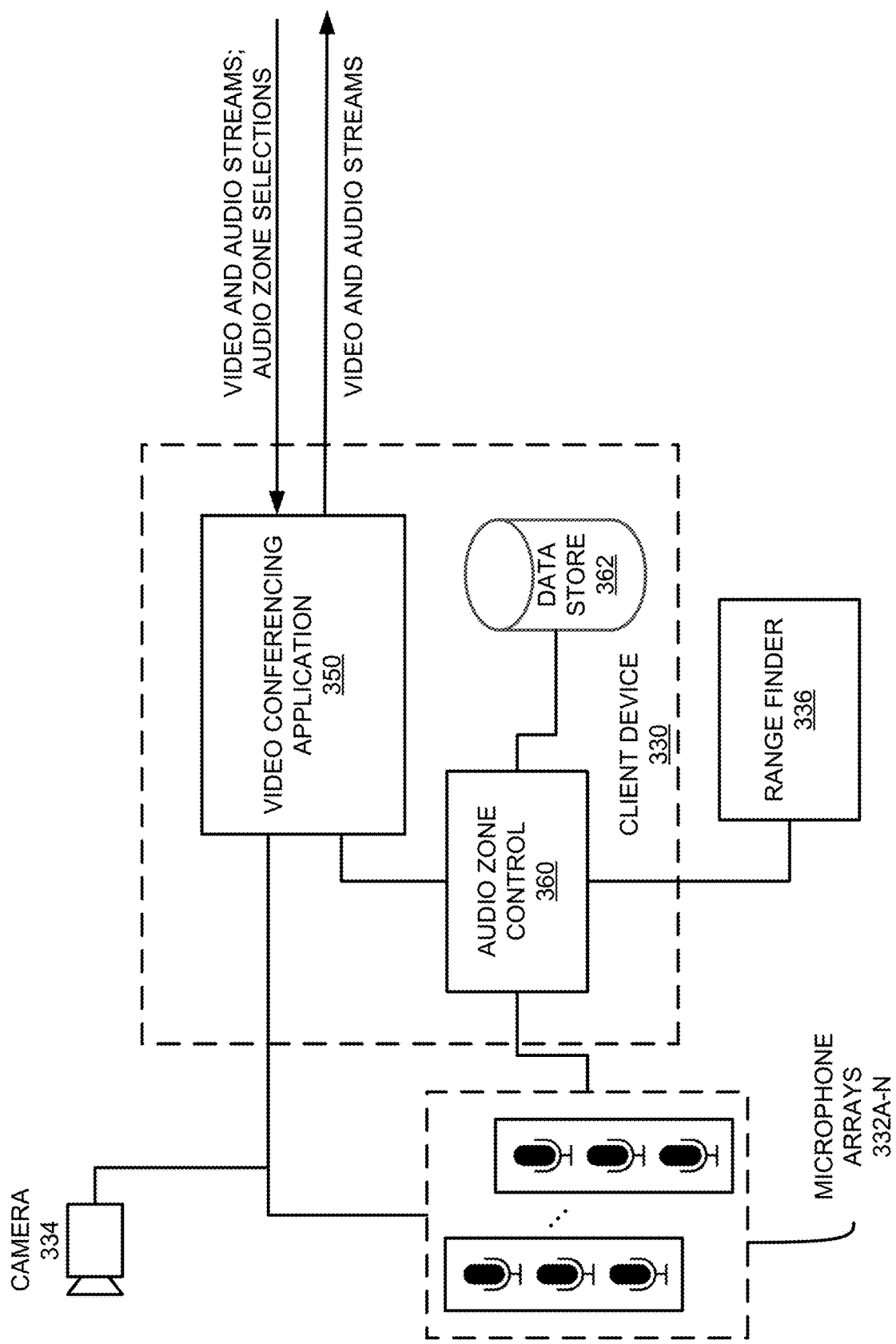

Referring now to FIGS. 3A-3B, FIG. 3A shows an example system 300 for remotely adjusting audio capture during video conferences. In this example system 300, a number of client device 330, 340a-n are connected to a video conference provider 310 via a communications network 320. In this example, the communications network 320 is the internet, however, any suitable communications network or combination of communications network may be employed, including LANs (e.g., within a corporate private LAN), WANs, etc.

Each client device 330, 340a-n executes video conference software, which connects to the video conference provider 310 and joins a meeting. During the meeting, the various participants (using video conference software at their respective client devices 330, 340a-n) are able to interact with each other to conduct the meeting, such as by viewing video streams and hearing audio streams from other participants, and by capturing and transmitting video and audio of themselves.

In this example, client device 330 provides video conferencing functionality to a group of people assembled in a common area, such as a conference room, similar to client device 240 in FIG. 2. While the client device 330 in some examples may include dedicated video conferencing equipment, in other examples, it may be a conventional computing device, such as a desktop or laptop computer, or a handheld device such as a tablet or smartphone. However, the client device 330 is connected to one or more microphone arrays 332a-n that can capture audio within the common area and provide corresponding audio streams.

As will be discussed in more detail below, the video conferencing application executed by client device 330 is able to receive selections of audio focus areas within the common area and select one or more of the microphone arrays 332a-n to capture audio from the selected regions and adjust the corresponding microphone array 332a-n for one or more particular regions to focus audio capture on those regions. The video conferencing application can then provide a separate audio stream corresponding to the selected audio regions.

During the discussion below, several similar terms will be referenced. An "audio focus area" refers an area on a screen selected by a participant from which the participant would like to receive focused audio. A "bounding region" refers to a region in an environment that has been determined to correspond to an audio focus area. An "audio focus zone" refers to a location within a bounding region that may be an audio source, such as a person's head or mouth.

Referring now to FIG. 3B, FIG. 3B shows a more detailed view of the user's client device 330. In this example, the client device 330 has one or more cameras 334 and one or more microphone arrays 332a-n, to allow the user to provide audio and video streams to the video conference. It is also connected to a range finder 336, which may be an ultrasonic range finder, an infrared range finder, etc. In addition, the client device 330 executes a video conferencing application 350 to allow the user to join and participate in video conferences hosted by the video conference provider 310, generally as discussed above.

In addition, the client device 330 executes audio zone control 360, which may be a part of the video conferencing application 350 in some examples. The audio zone control 360 receives information about selected audio zones from remote client devices, e.g., client devices 340a-n, and selects a microphone array 332a-n, determines a corresponding region within the common area, and adjusts the selected microphone array 332a-n to capture audio from the selected audio focus area. The audio stream from the selected microphone array 332a-n is then transmitted as a separate audio stream from audio streams from other microphone arrays.

During a video conference, the client device 330 may use multiple microphone arrays 332a-n positioned within the common area to capture audio at various locations, merge them into a single audio stream, and provide the combined audio stream to the video conference provider 310, which then provides the audio stream to the other participants. If a remote participant selects a particular region within the common area, as captured by the client device's camera 334, the client device 330 may create a separate audio stream for the microphone array 332a-n that is adjusted to capture audio from the corresponding region and separately transmit that audio stream. The user that selected the region may then receive only that new audio stream, or they may receive some or all transmitted audio streams from the client device 330, but have the option to mute or change the volume of each audio stream independently so that they may listen to the selected audio stream.

To capture audio from a specific region, the audio zone control 360 functionality receives information from the remote client device about a selected audio focus area. In this example, the selected audio focus area is denoted by a selected area within a video stream captured by a camera 334 and as presented to the remote user. The audio zone control 360 accesses data store 362 to obtain parameters about the common area, the positions or orientations of the various microphone arrays 332a-n, and the position and orientation of the corresponding camera 334. The information may also identify the particular video stream in which the selection is made, to enable the audio zone control to access position information for the correct camera 334.

Based on the area selected, the audio zone control 360 can use the dimensions of the common area, and the position and orientation of the corresponding camera to project the two-dimensional selected area onto the three-dimensional scene to determine a region of the common area. However, because the selected region may not include depth information, the audio zone control 360 then determines how far from the camera the audio focus area corresponds to. To determine the distance, the audio zone control 360 can use the range finder to determine a distance to a corresponding region in the common area. Alternatively, it may identify one or more objects located within the selected region, such as one or more people, chairs, tables, microphone arrays, etc. Based on information about the common area, such as pre-programmed locations of inanimate objects, such as conference tables, microphone arrays, etc. the audio zone control 360 may be able to determine the approximate location within the room of a three-dimensional or "bounding" region enclosing the identified objects. The edges of the bounding region may be selected to enclose the objects within the selected region, with a small or no buffer region. Once the bounding region is established, the audio zone control 360 may use the center or centroid of the bounding region as the target for a microphone array, thereby creating an audio focus zone. In some examples, however, the audio zone control 360 may further determine a target within the bounding region, such as a person or persons within the bounding region. If only one person is within the bounding region, the audio zone control 360 may establish an audio focus zone at the person. If multiple people are within the bounding region, the audio zone control 360 may select a location between the multiple people as the audio focus zone.

Once the bounding region is identified, the audio zone control 360 accesses the data store 362 to determine a microphone array 332a-n to capture audio from the audio focus zone. The audio zone control 360 may select a microphone array 332a-n that is physically closest to the audio focus zone. If that microphone array is already targeting a different audio focus zone, a different microphone array that is next closest to the audio focus zone may be selected. Or if the different audio focus area is no longer selected, e.g., because the remote user has selected a new audio focus area or canceled an existing audio focus area, the microphone array 320a-n may be re-assigned to the new bounding region. In some examples, the audio zone control 360 may re-assess all audio focus zones and microphone arrays 332a-n when the new audio focus zone is determined to re-allocate microphone arrays 332a-n to capture audio from all active audio focus zones.

To capture audio from a selected audio focus zone, the audio zone control 360 may cause the selected microphone array 332a-n to physically move, such as by rotating or translating the microphone array 332a-n or rotating or translating one or more individual microphones within the microphone array 332a-n. In some examples, a microphone array 332a-n may use beamforming techniques to capture audio from a particular direction or location. To make use of the beamforming functionality, the audio zone control 360 may provide one or more beamforming parameters to the microphone array 332a-n, such as a distance from the microphone array 332a-n to the audio focus zone and one or more angles from the microphone array 332a-n to the audio focus zone, or an (x, y, z) coordinate of the center or centroid of the audio focus zone. The microphone array 332a-n may then use such information to adjust audio processing of audio from the respective microphones within the array, e.g., based on different times of arrival for sound at each microphone in the array, to capture audio from the selected audio focus zone. In some examples, the audio zone control 360 itself may handle the audio processing to enable the beamforming functionality in the selected microphone array 332a-n.

Audio from each audio focus zone may then be captured and provided to the video conferencing application 350, which separately transmits each captured audio stream. The discrete audio streams may be transmitted independently of each other as separate audio streams, or may be multiplexed into a single stream, which may then be demultiplexed at the receiving client device to access captured audio from one or more particular audio focus zones.

Figure 4:
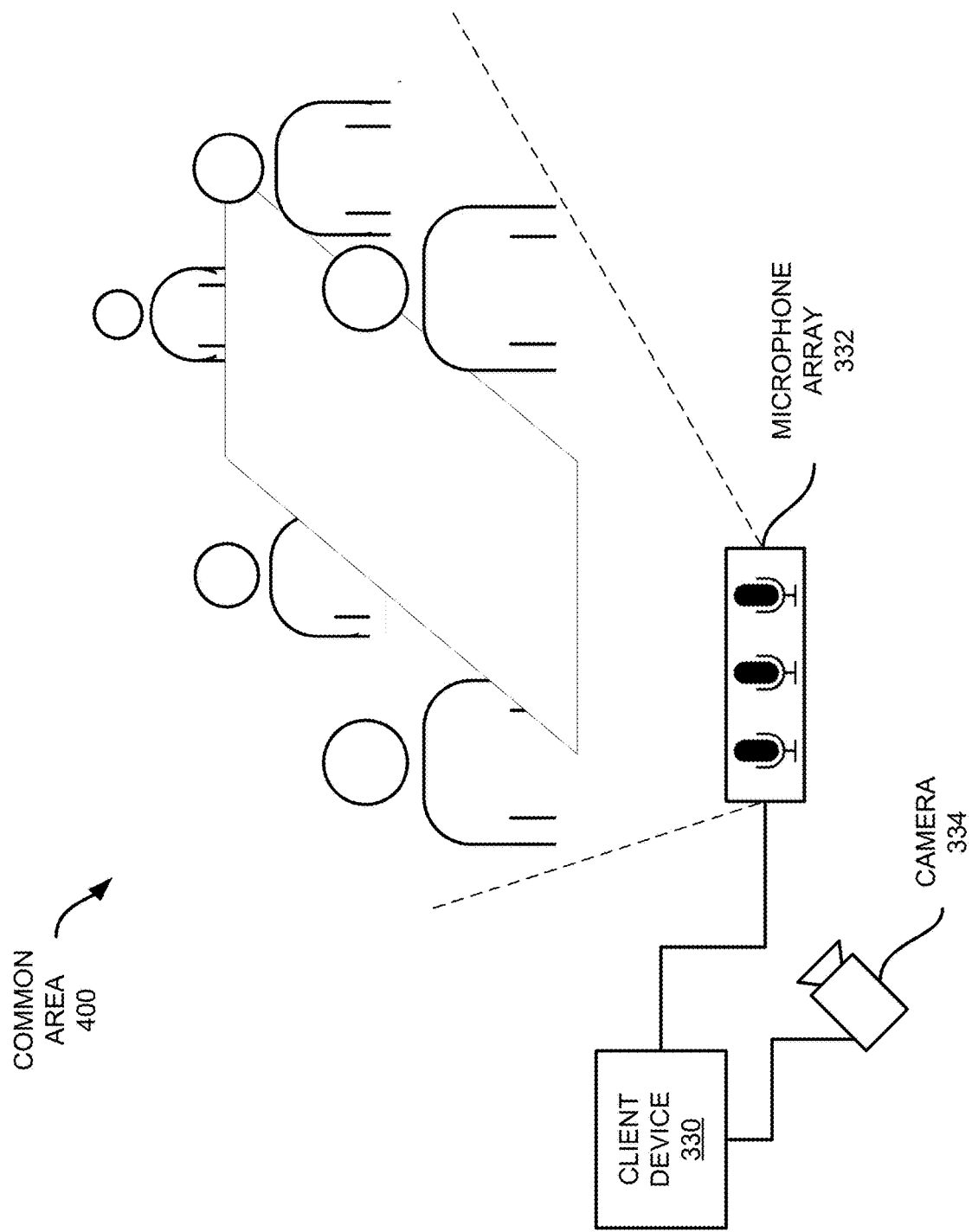
FIG. 4 shows an example common area suitable for use with systems and methods for remotely adjusting audio capture during video conferences.

To illustrate this process, FIG. 4 shows an example common area with people participating in a video conference using client device 330. In this example, the client device 330 is only connected to one microphone array 332 and one camera 334. As depicted in FIG. 4, the microphone array 332 captures audio from the entire common area 400 because no audio zone has been selected.

Figure 5:
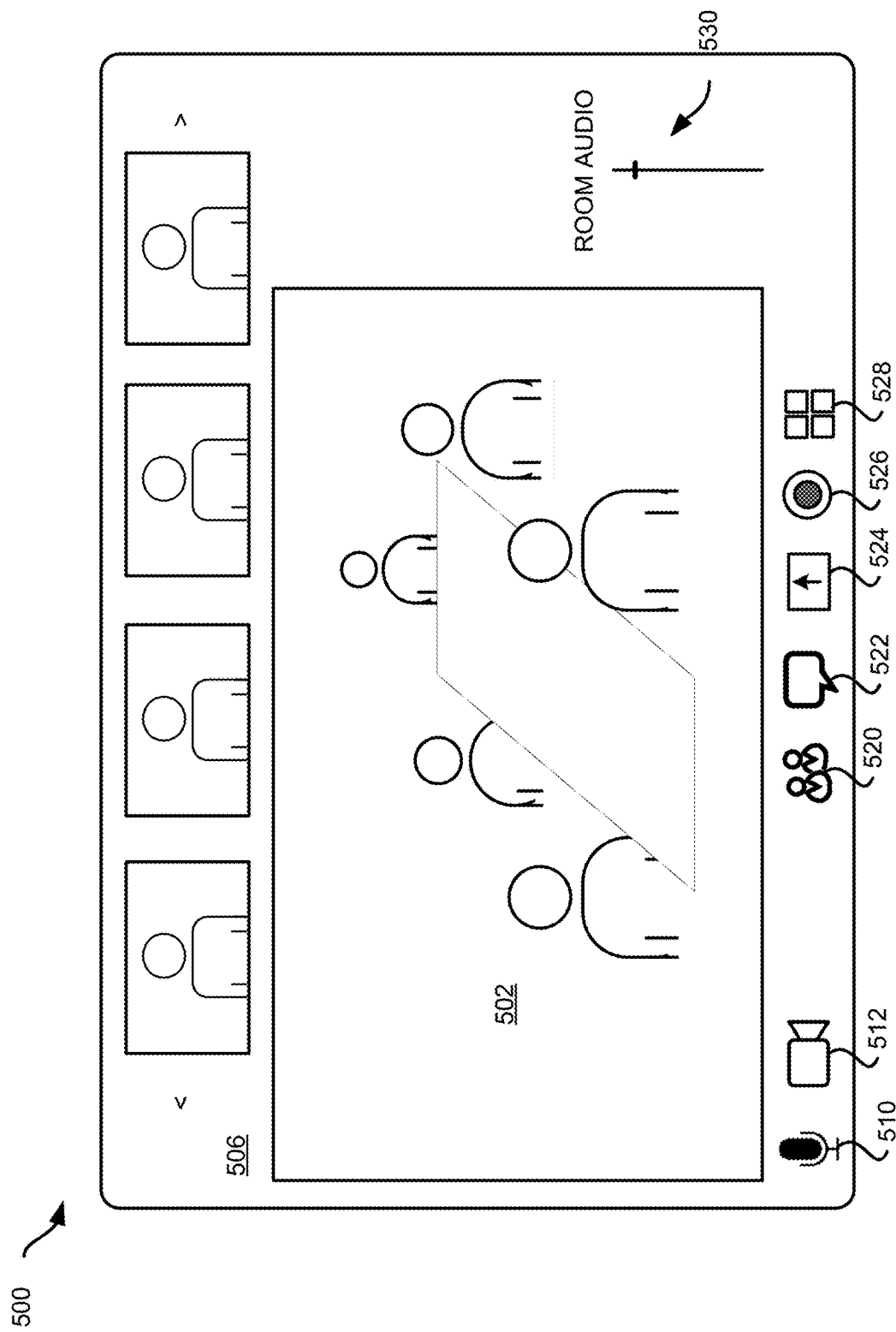
FIGS. 5-6 show example graphical user interfaces for remotely adjusting audio capture during video conferences.

FIG. 5 illustrates the GUI 500 used by a participant at a client device, e.g., client device 340a, that is in a video conference with the participants at the common area 400. The GUI 500 includes a speaker view window 502 that presents the current speaker in the video conference. Above the speaker view window 502 are smaller participant windows 504, which allow the participant to view some of the other participants in the video conference, as well as controls ("<" and ">") to let the host scroll to view other participants in the video conference.

Beneath the speaker view window 502 are a number of interactive elements 510-528 to allow the participant to interact with the video conference software. Controls 510-512 may allow the participant to toggle on or off audio or video streams captured by a microphone or camera connected to the client device. Control 520 allows the participant to view any other participants in the video conference with the participant, while control 522 allows the participant to send text messages to other participants, whether to specific participants or to the entire meeting. Control 524 allows the participant to share content from their client device. Control 526 allows the participant toggle recording of the meeting, and control 528 allows the user to select an option to join a breakout room.

As shown in FIG. 5, the user of client device 340a is able to view the video stream from the client device 330 and hear the audio provided by its microphone array 332. They may also be able to adjust the incoming audio stream volume using the "Room Audio" volume control 530. However, the user may decide to select a region in the video stream from where they would like to better hear the audio.

Figure 6:
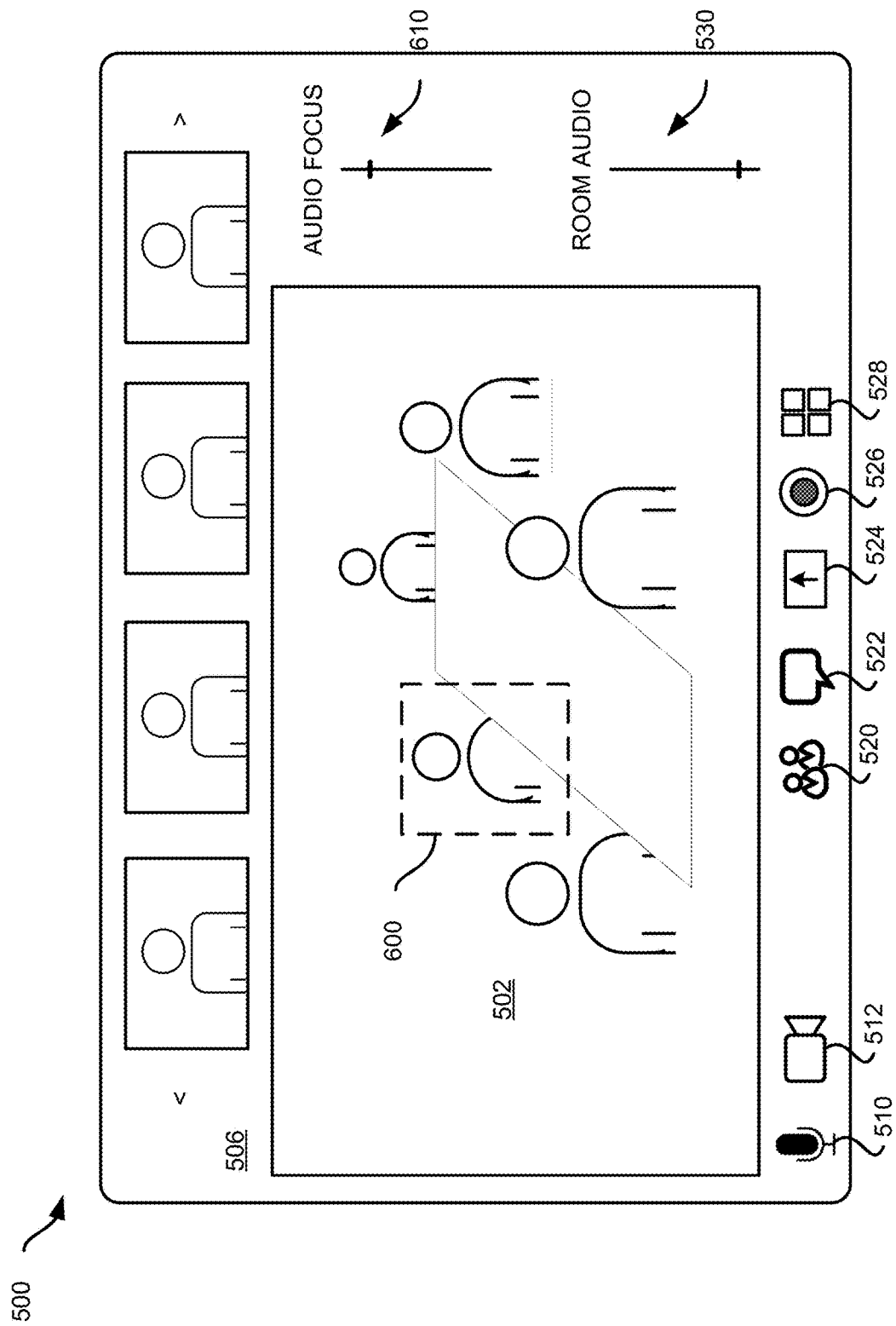

Referring to FIG. 6, the user has selected a portion 600 of the video stream by drawing a bounding box around the desired area within the video stream, referred to as the "audio focus area." The GUI 500 allows the user to use a mouse or touch input to establish the bounding box, which is rectangular in this example, though any shape may be used. After selecting the area, the GUI 500 provides the area to the video conferencing application executing on the user's client device 340a, which then provides that area to the client device 330 via the video conference provider 310. In some examples, rather than drawing a bounding box, the user may zoom into the video stream, which may provide a similar audio focus area including just the portion of the video stream the user has zoomed into.

In addition, in some examples, the video conferencing application 350 may determine one or more audio focus areas to suggest to the user, such as by drawing one or more bounding boxes on the screen and allowing the user to select one or more of them. For example, the video conferencing application 350 may identify one or more people within the video stream and suggest audio focus areas for one or more of the people. In one configuration, the video conferencing application 350 may automatically focus on audio focus areas to provide the best possible audio to remote participants without requiring any input.

Once the user has selected an audio focus area 600, they may be provided a new volume control 610 that may let them independently adjust the volume received from different audio streams from the client device 330. In this case, the user has set a higher volume for the audio focus area 610 than for the room audio 530. In one example, each user may independently adjust the volume for different audio streams locally. In another example, the users may collectively adjust the volume for different audio streams that are then experienced by all users.

Figure 7:
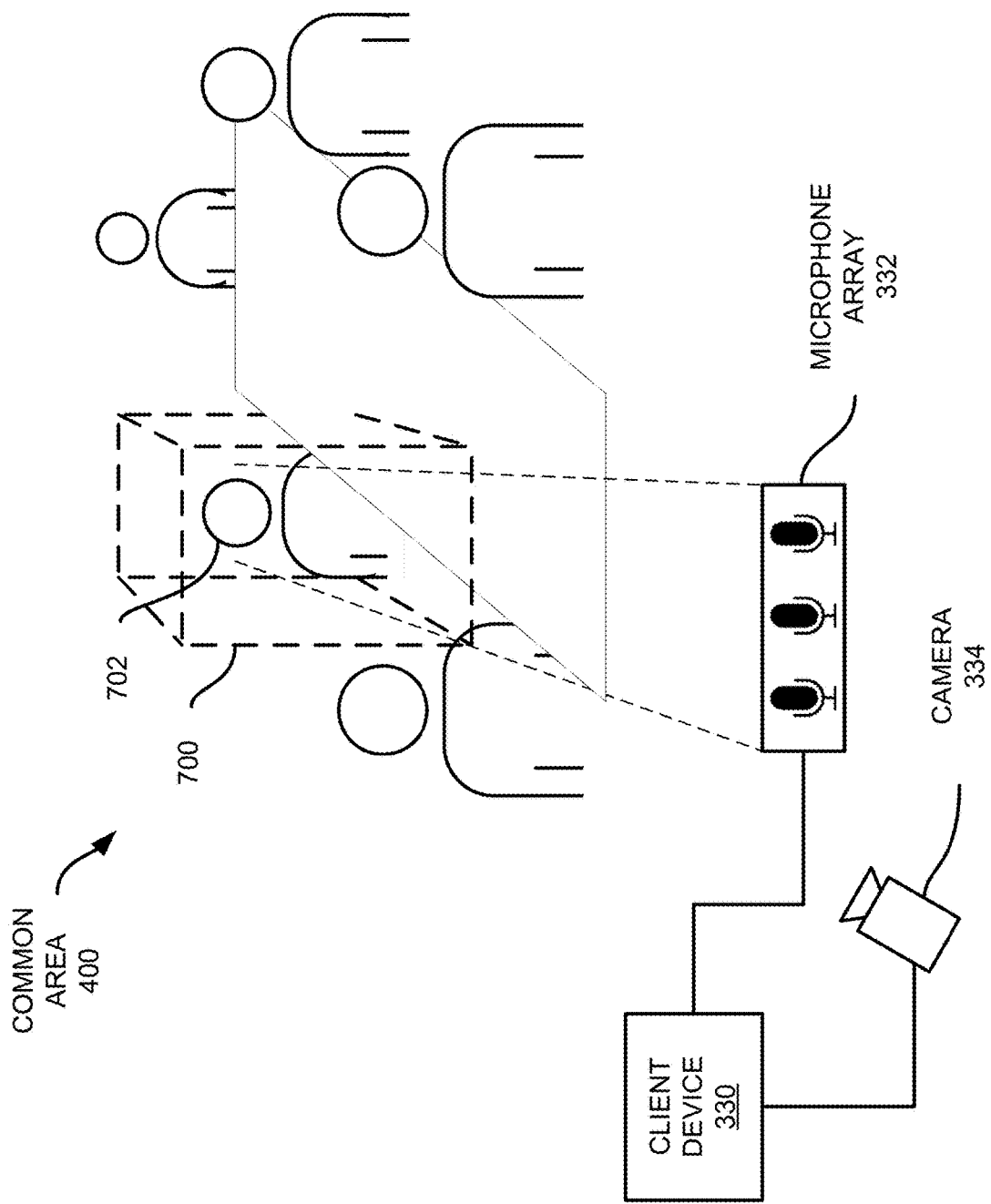
FIG. 7 shows an example common area with boundary regions according to example systems and methods for remotely adjusting audio capture during video conferences.

Referring to FIG. 7, the client device 330 has received the selected area from the remote client device 340a and has determined a bounding region 700 within the common area 400 based on the position and orientation of the camera 334 and the dimensions of the common area or based on locations of one or more objects in the common area that are shown in the video stream and within the selected area. In this example, the client device 330 has further determined that a person 702 is located within the bounding region 700. The audio zone control 360 has then adjusted the microphone array to capture audio from an audio focus zone at the person 702 within the bounding region. The audio is then provided to the participant via the video conference provider 310.

Because, in this example, client device 330 only has one microphone array 332, the client device 330 may only provide one audio stream, irrespective of whether an audio focus area has been selected by a participant or not. Though in some examples, the client device may be able to subdivide the microphones within the microphone array to perform beamforming using a subset of the microphones to capture audio from the bounding region 700 generally, or from the audio focus zone at the person 702, while still capturing audio from the remainder of the common area 400 using the remaining microphones within the array 332. In such an example, the client device 332 may provide discrete audio streams for the bounding region or audio focus zone and the rest of the common area 400. Further in some examples, the client device 330 may identify one or more microphones or microphone arrays that are nearest to the bounding region and disable the remaining microphones or microphone arrays. This may result in capturing audio from the bounding region without requiring repositioning any microphones or performing any beamforming operations. Similarly, if multiple bounding regions are identified within the same environment, only those microphones nearest the various bounding regions may be activated, while any remaining microphones may be deactivated.

In some examples, however, rather than using information about the dimensions of the common area or known locations of objects in the room, the computing device 330 may directly determine the distance to a particular region by using active range detection, such as by using an ultrasonic or infrared range finder 360.

Figure 8:
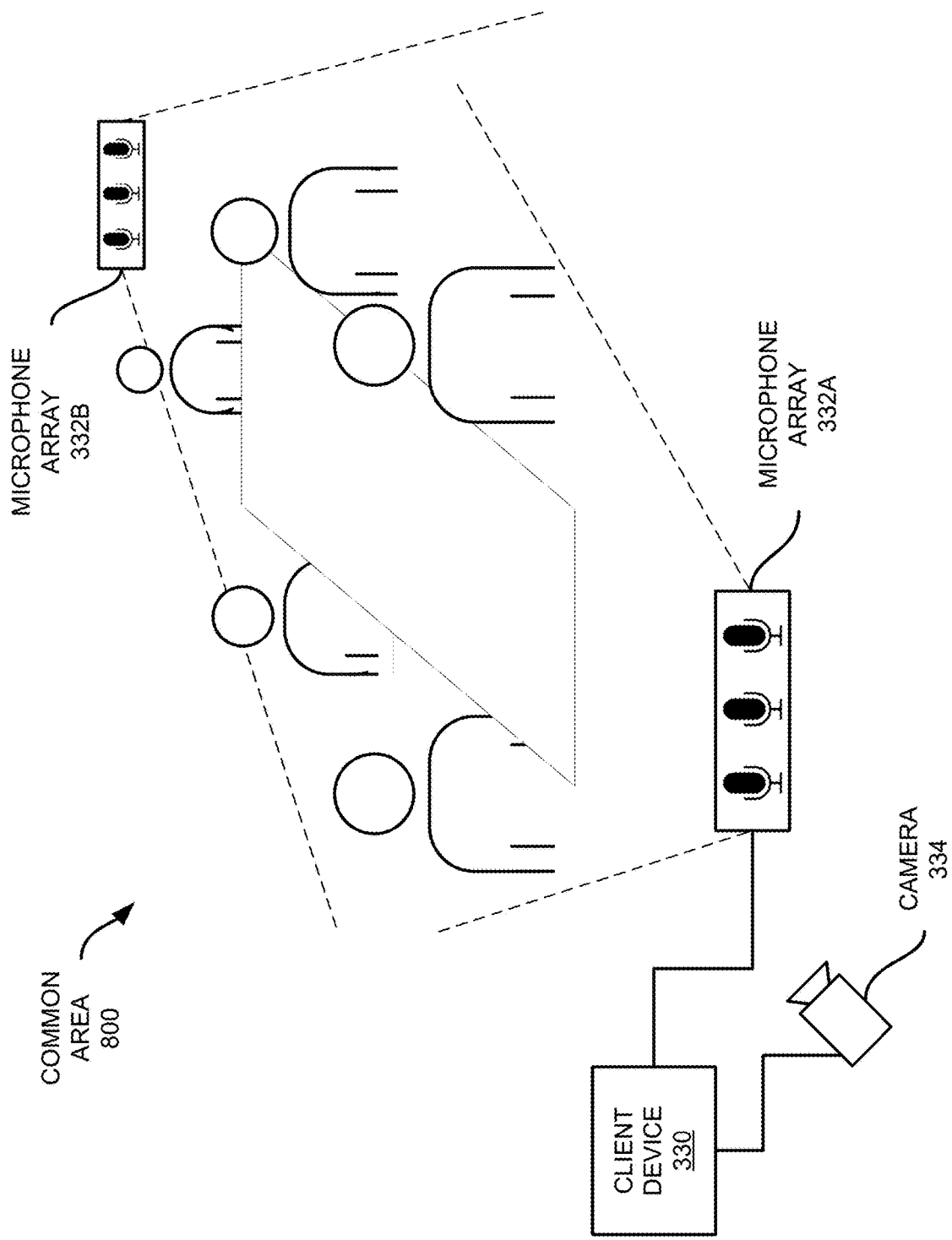
FIG. 8 shows an example common area suitable for use with systems and methods for remotely adjusting audio capture during video conferences.

Referring to FIG. 8, FIG. 8 shows another common area 800, similar to the common area 400 shown in FIG. 4. However, in this example, the client device 330 is connected to two microphone arrays 332a-b, one positioned at one end of the common area and one at the opposite end of the common area from the camera 334. As with the discussion above with respect to FIG. 4, when no bounding regions are selected, the two microphone arrays 332a-b capture across the entirety of the common area 800. But, as will be discussed below, each may be separately targeted towards a particular bounding region.

Figure 9:
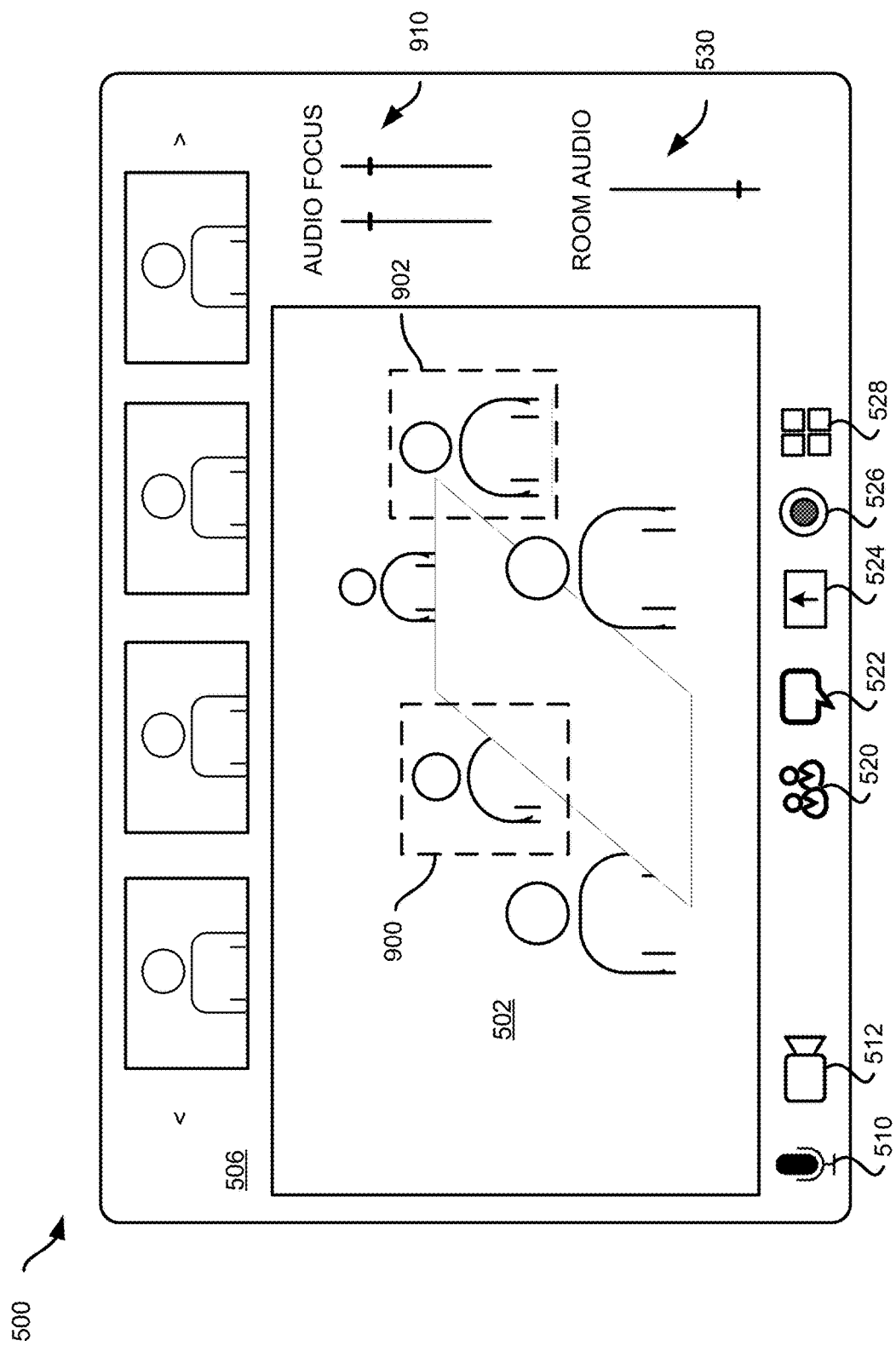
FIG. 9 shows an example graphical user interface for remotely adjusting audio capture during video conferences.

In FIG. 9, the GUI 500 at client device 340a again shows a view of a common area 800 provided by the client device 330. In this example, however, the user has selected two audio focus areas 600, 602. These audio focus areas 900, 902 are provided to the client device 330 via the video conference provider 310, as discussed above with respect to FIG. 6. In addition, the GUI 500 has been adjusted to provide separate volume controls 910 for the two audio focus zones.

Figure 10:
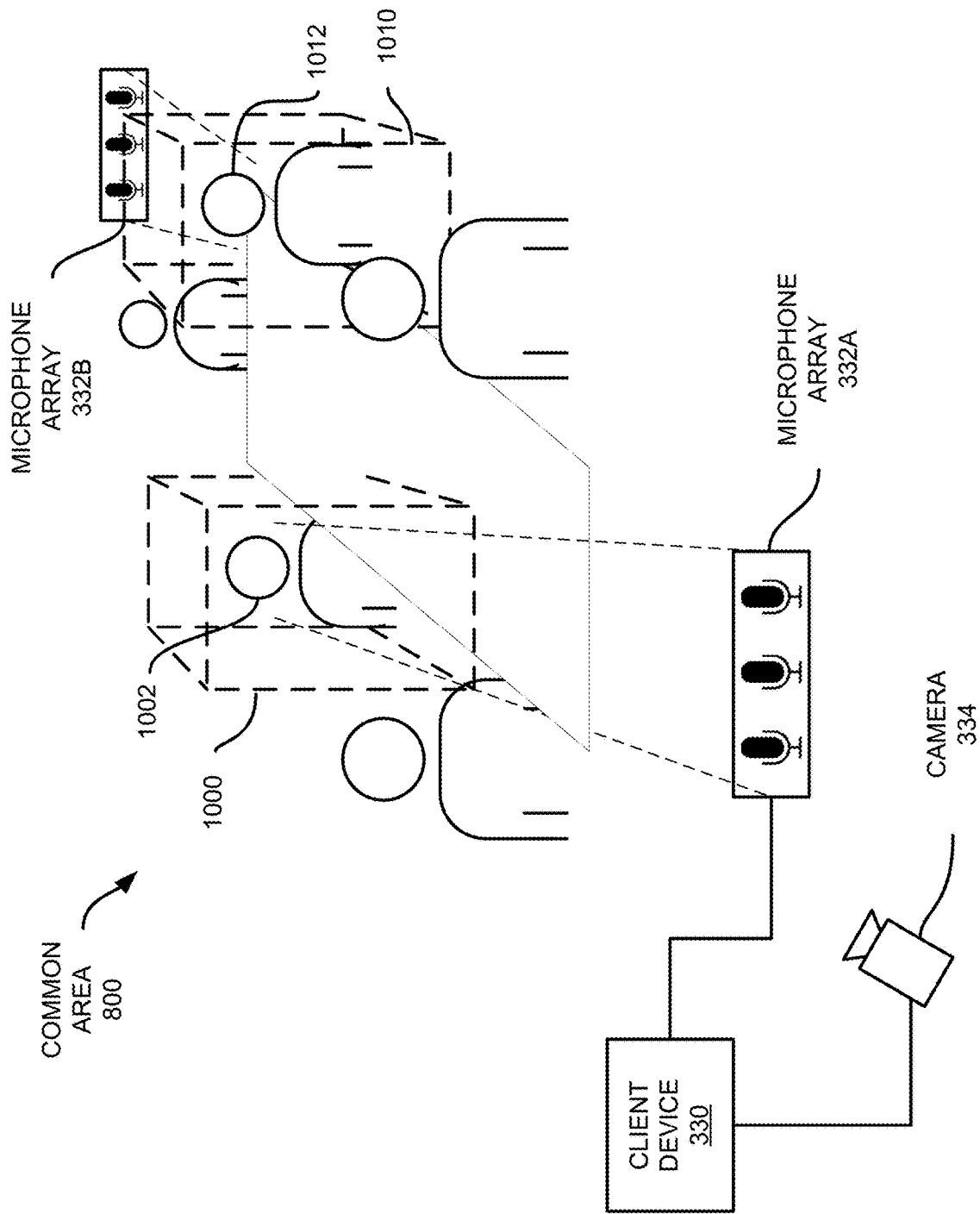
FIG. 10 shows an example common area with boundary regions according to example systems and methods for remotely adjusting audio capture during video conferences.

In FIG. 10, the client device 330 has received the two audio focus areas 900, 902 and translated them to corresponding bounding regions 1000, 1010 within the common area 800. In addition, the client device 330 has identified people 1002, 1012 within each bounding region 1000, 1010 and has established audio focus zones at each person. It has then selected one microphone array 332a to target the audio focus zone at the person 1002 in one bounding region 1000, and the other microphone array 332b to target the audio focus zone at the person 1012 in the other bounding region 1010. Each of these audio streams is then provided independently of each other so that the user may separately control the volumes of each. Further, as discussed above with respect to FIG. 7, the client device 330 may only use a subset of each microphone array 332a-b to capture audio from the respective audio focus zone and may instead use the remaining microphones to capture audio generally from the common area. Thus, the client device 330 may provide three (or more) audio streams to the remote client 340a via the video conference provider 310.

Similarly, the client device 330 may use subsets of the microphones in one array to capture audio from multiple bounding regions or audio focus zones, or may use subsets of microphones from multiple microphone arrays to capture audio from a single bounding region or audio focus zone. Thus, the individual microphones within microphone arrays may be separately grouped within the microphone array or with one or more microphones from another array (or multiple other arrays) to create "virtual" microphone arrays to capture either audio from a bounding region or audio focus zone or from the common area generally.

Figure 11:
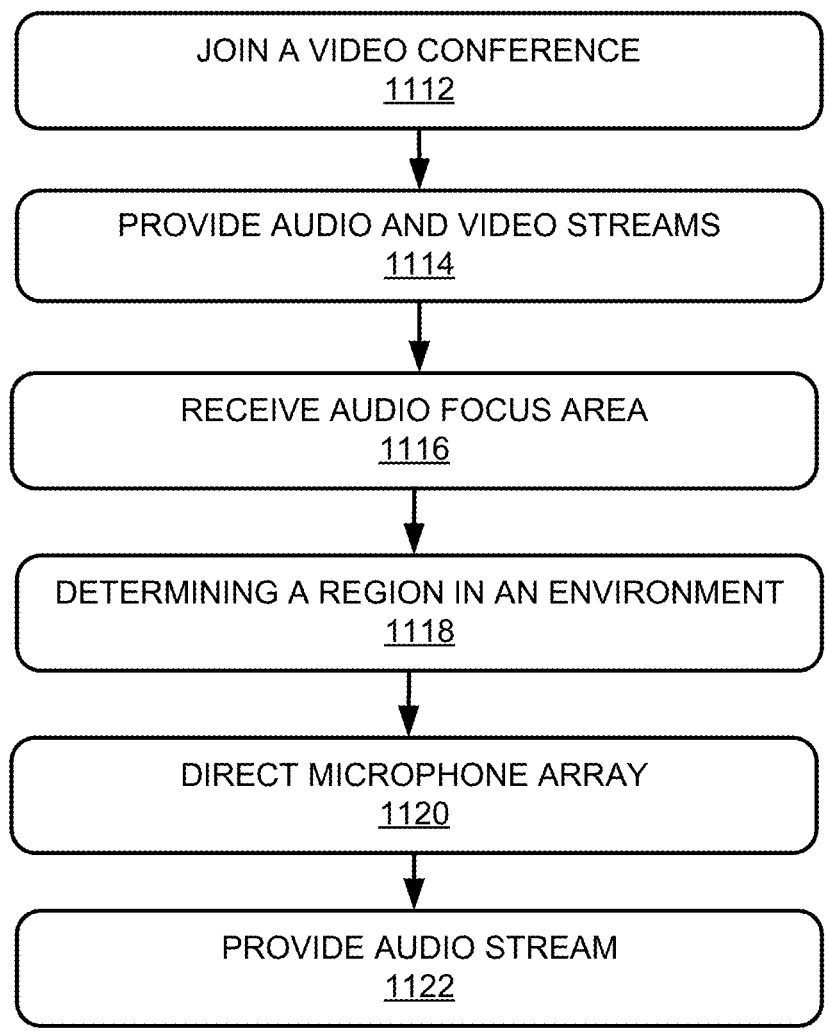
FIGS. 11-13 show example methods for remotely adjusting audio capture during video conferences.

Referring now to FIG. 11, FIG. 11 shows an example method 1100 for remotely adjusting audio capture during video conferences. The method 1100 will be described with respect to the system shown in FIGS. 3A-3B and the GUIs 500 shown in FIGS. 5, 6, and 9. However, it should be appreciated that any suitable system or GUI according to this disclosure may be employed, including the systems 100, 200 shown in FIGS. 1 and 2.

At block 1112, the user of a client device 330 uses the video conferencing application 350 to join a video conference hosted by the video conference provider 310, generally as described above with respect to FIGS. 1-3A and 3B.

At block 1114, the video conferencing application 350 provides an audio stream and a video stream to the video conference provider 310. As discussed above, such as with respect to FIGS. 1-2, client devices participating in a video conference may capture audio and video streams using microphones and cameras and provide those streams to the video conference provider 310 to enable the participants to see and hear each other.

At block 1116, the video conferencing application 350 receives an audio focus area associated with a video stream provided by the client device 330. As discussed above with respect to FIGS. 4-10, a user at a remote client device, e.g., 340a, may interact with a video stream displayed within a GUI 500 to select an audio focus area in the video stream. The size and shape of the audio focus area may be selected by a user and the coordinates or boundaries of the audio focus area may be provided to the client device 330 that provided the video stream. Thus, the client device 330 receives information identifying the audio focus area, such as coordinates of corners of a bounding box, or identifications of pixels defining the audio focus area. In some examples, the audio focus area may identify a particular participant in a video stream. For example, the user may touch a person displayed in the video to select the person as the audio focus area. Thus, the client device 330 may receive an identification of the contact location and determine a person associated with the contact location. In addition to providing a coordinate, the client device 330 may also receive a captured video frame, which may ensure that the environment has not changed in the interim between the user selecting the audio focus zone and the client device 330 accessing the video stream to determine a person associated with the selected coordinate. The video conferencing application 350 or the audio zone control 360 may then identify the person, e.g., using object recognition or face recognition techniques, and identify a corresponding location in the video stream with the person.

In some examples, the audio focus area may also identify the corresponding video stream. For example, if the client device is providing multiple videos streams, e.g., because it is using multiple cameras, the audio focus area needs to identify which video stream is identified so that the client device 330 can determine which camera the audio focus area corresponds to.

At block 1118, the client device 330 determines a bounding region within an environment shown in the video stream. As discussed above with respect to FIGS. 7 and 10, the video conferencing application 350 may employ audio zone control 360 functionality to determine the bounding region. As discussed above, the audio zone control 360 may access a data store 362 to obtain information about the position and orientation of a camera 340, a position and orientation of one or more microphone arrays 332a-n in the environment, and in some examples, dimensions of the common area, e.g., the size of a conference room, and locations of one or more objects within the common area, e.g., conference tables, chairs.

Based on the position and orientation of the camera 334, the audio zone control 360 can determine a field of view of the camera 334. In addition, based on the size of the common area or the locations of objects within the room, the audio zone control 360 can determine an approximate distance from the camera for various objects within the field of view. For objects that are depicted within the audio focus area, the audio zone control 360 can determine their depths and determine a bounding region in space that encloses one or more of the objects. In some examples, a bounding region may be sized to capture objects such as people, but to ignore other objects, such as walls, chairs, etc. Thus, objects that are within the audio focus area, but are unlikely to be audio sources, may be ignored to bias the analysis towards likely audio sources. Thus, a bounding region may be generated to enclose the likely audio sources shown in the video stream and corresponding to the audio focus area, such as shown in FIGS. 7 and 10.

In some examples, the audio focus area may target a specific person, such as discussed above with respect to block 1116. The video conferencing application 350 may identify the person within the video stream using object recognition or facial recognition and may provide the location of the person within the video stream to the audio zone control 360. The audio zone control 360 may then determine the approximate location of the person within the common area, such as based on apparent proximity to known objects within the common area.

At block 1120, the video conferencing application 350 directs a microphone array to capture audio from the bounding region. As discussed above, the video conferencing application 350 may employ the audio zone control 360 to control the microphone array(s) 332*a-n*, such as to change their orientation or position, or to adjust one or more beamforming parameters to target a particular location within the common area. In addition, the audio zone control 360 may select a microphone array 332*a-n*, or a subset of microphones within a microphone array 332*a-n*, to use to target the bounding region. For example, the audio zone control 360 may determine an approximate center or centroid of the bounding region and select a microphone array that is physically the closest to the center or centroid and that is not already focusing on a bounding region. Or it may select the microphone array that is closest, irrespective of whether it is focused on a bounding region and reassign microphone arrays to capture any active bounding regions. Alternatively, the audio zone control 360 may select individual microphones within a microphone array 332*a-n* to adjust, while allowing other microphones to continue to capture audio from another bounding region or generally from the common area.

In some examples, another client device, e.g., client device 340*b*, may have already identified a target audio area, which has been mapped to a bounding region. If the bounding region determined at block 1120 is the same or similar to the previously defined bounding region, e.g., they overlap, the client device 330 may re-use the existing bounding region, or it may modify it, such as by enlarging it, to accommodate the newly identified audio focus area. Thus, multiple audio focus areas received from multiple client device 340*a-n* may be handled using a common bounding region.

At block 1122, the video conferencing application 350 provides captured audio from the selected microphone array as an audio stream to the video conferencing provider 310. As discussed above, the video conferencing application 350 sends audio streams to the video conference provider 310, which distributes them to the other participants in the video conference. In this example, the client device 330 creates a new audio stream corresponding to the bounding region and identifies to the video conference provider 310 which client device 340*a* identified it. The video conference provider 310 receives the new audio stream and provides it to the client device 340*a*.

If, as discussed above with respect to block 1120, the audio focus area identified by the client device 340*a* maps to an existing bounding region in the common area 400, then the video conferencing application 350 may not create a new audio stream, but may instead provide the existing audio stream corresponding to the bounding region to the client device 340*a*.

In some examples, the client device 330 may also provide information about the received audio focus area to the other participants in the video conference. This may allow the video conferencing applications executing at the various client devices to provide an indicator within the respective GUIs to show existing audio focus areas. This may allow users to select previously identified audio focus areas rather than creating a new one.

The method 1100 above has been discussed primarily with respect to a single client device 340*a* identifying a single audio focus area; however, it should be appreciated that the method 1100 may be performed any number of times during the course of a video conference and with respect to any number of participants, though there may be practical limits in a particular system on how many bounding regions may be accommodated by available microphones.

Figure 12:
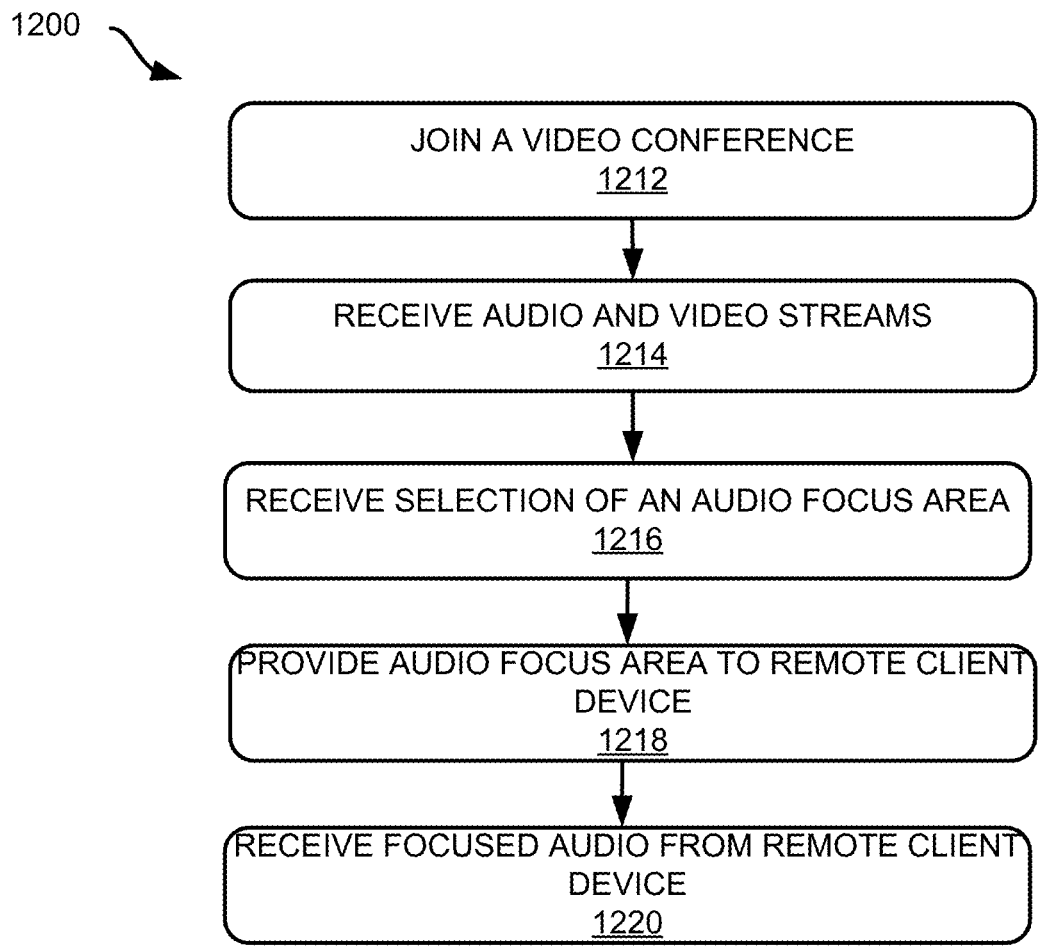

Referring now to FIG. 12, FIG. 12 shows an example method 1200 for remotely adjusting audio capture during video conferences. The method 1200 will be described with respect to the system shown in FIGS. 3A-3B and the GUIs 500 shown in FIGS. 5, 6, and 9. However, it should be appreciated that any suitable system or GUI according to this disclosure may be employed, including the systems 100, 200 shown in FIGS. 1 and 2.

At block 1212, the user of a client device 340*a* uses the video conferencing application 350 to join a video conference hosted by the video conference provider 310, generally as described above with respect to FIGS. 1-3A and 3B.

At block 1214, the video conferencing application 350 receives audio and video streams from the video conference provider 310, generally as described above with respect to FIGS. 1-2, and outputs them to the user via a GUI 500 and speakers attached to the client device 340*a*.

At block 1216, the video conferencing application 350 receives a selection of an audio focus area 600, generally as described above with respect to FIG. 6. In this example, the user has selected a video stream, which is presented in the speaker view window 502, and has used their mouse to place and size a rectangular audio focus area 600; however, any suitable input device may be used and further, the audio focus area may have any suitable shape, whether polygonal, freeform, etc.

In some example, the user may also be presented with identifiers of audio focus areas selected by other participants in the video conference. For example, the video conferencing application 350 may illustrate existing audio focus areas in the GUI by drawing an outline of the existing audio focus areas, e.g. using different colors to indicate which participants provided each audio focus area. The user may then select an existing audio focus area rather than drawing a new audio focus area.

At block 1218, the video conferencing application 350 provides the audio focus area to the remote client device 330. In this example, the video conferencing application provides the size and location of the audio focus area with respect to the received video stream to the client device 330 via the video conference provider 310. In some examples the video conferencing application 350 may also provide an identifier of the video stream itself to enable the client device 330 to differentiate between different video streams provided by different cameras attached to the client device 330.

At block 1220, the video conferencing application 350 receives a focused audio stream from the video conference provider 310 that corresponds to the selected audio focus area. In this example, the video conferencing application 350 then outputs the audio from the focused audio stream using the client device's speakers. In some examples, the user may be able to switch between different audio streams by selecting areas on the video stream after the audio focus area has been created. For example, the user may select a location outside of the audio focus area to hear the audio from the common area 400 generally, and then may re-select the audio focus area to resume hearing the focused audio. As discussed above, the audio focus area may be one that has been created by the user or instead may be one that was created by one or more of the other participants.

Figure 13:
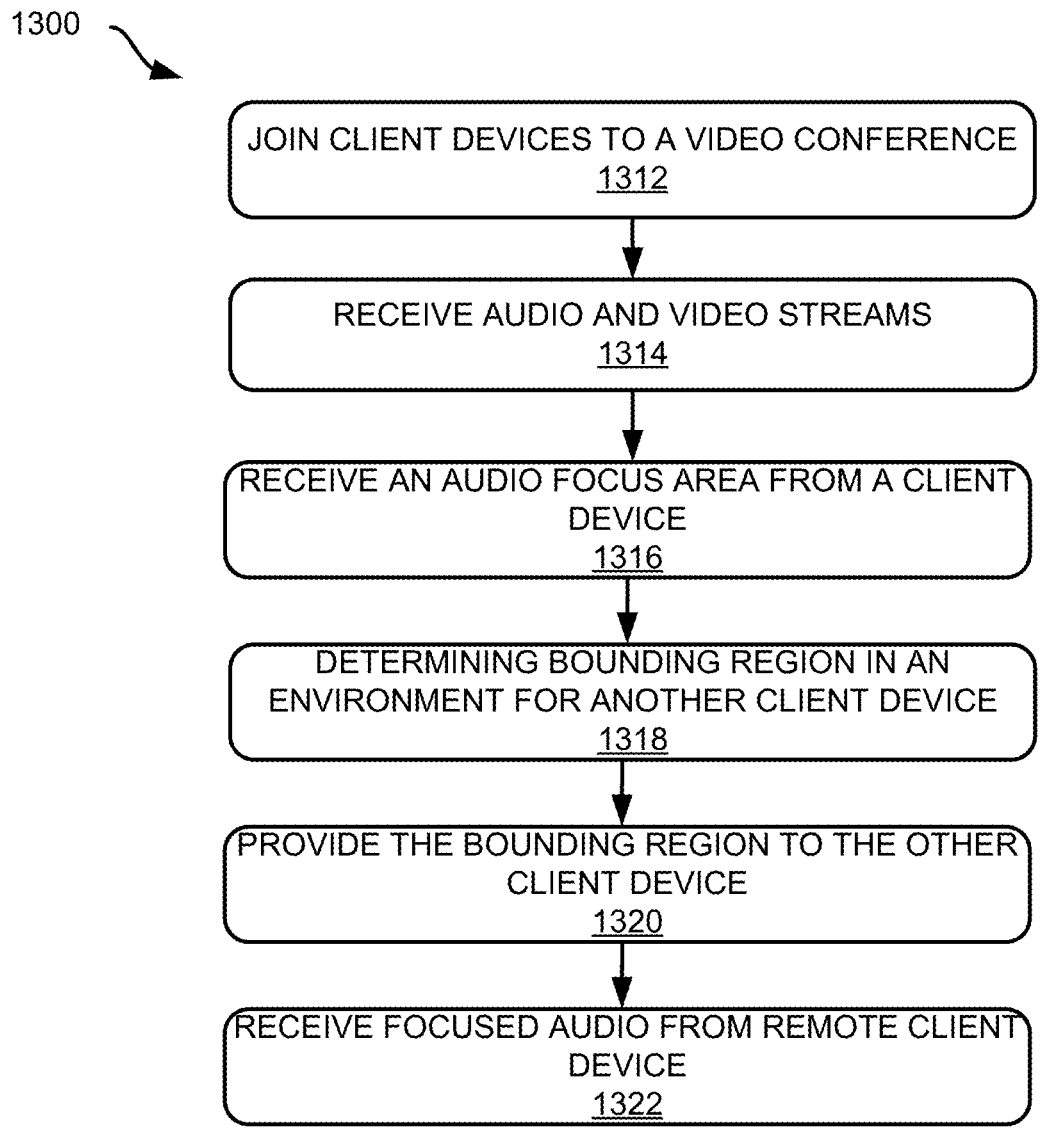

Referring now to FIG. 13, FIG. 13 shows an example method 1300 for remotely adjusting audio capture during video conferences. The method 1300 will be described with respect to the system shown in FIGS. 3A-3B and the GUIs 500 shown in FIGS. 5, 6, and 9. However, it should be appreciated that any suitable system or GUI according to this disclosure may be employed, including the systems 100, 200 shown in FIGS. 1 and 2. This example method is described from the perspective of the video conference provider 310.

At block 1312, the video conference provider 310 joins first and second client devices 330, 340a to a videoconference meeting hosted by the video conference provider in response to requests from the first and second client devices 330, 340a to join the video conference meeting, generally as described above with respect to FIGS. 1 and 2.

At block 1314, the video conference provider 310 receives audio and video streams from the first and second client devices 330, 340a, generally as described above with respect to FIGS. 1 and 2.

At block 1316, the video conference provider 310 receives, from the second client device 340a, an audio focus area associated with the video stream provided by the first client device. As discussed above, a participant may select an area within a video stream using their GUI 400. In this example, the audio focus area is provided to the video conference provider 310 rather than to the first client device 330. Instead, the video conference provider 310 has been provided with information associated with the environment of the first client device 330. For example, the first client device 330 may access information associated with its environment, such as the location or orientation of one or more cameras or microphones, dimensions of the room, and locations of one or more objects within the environment, such as those characteristics discussed above with respect to FIG. 7. It may then provide such information to the video conference provider 310 to enable the video conference provider to determine bounding regions within the environment.

At block 1318, the video conference provider 310 determines a bounding region in the environment shown in the video stream, generally as described above with respect to block 1118.

At block 1320, the video conference provider 310 provides the bounding region to the first client device 330. In this example, the video conference provider 310 provides coordinates of corners or edges of the bounding region. In some examples, it may provide other information describing the bounding region, such as a distance and orientation with respect to the camera and height, width, and depth of the region. Any other suitable description of the bounding region may be used in various examples.

At block 1322, the video conference provider 310 receives a focus audio stream from the first client device, where the focused audio stream is captured by one or more microphones that have been focused on the bounding region. The video conference provider 310 can then provide the focused audio stream to the second client or make the focused audio stream available to any clients within the video conference.

Figure 14:
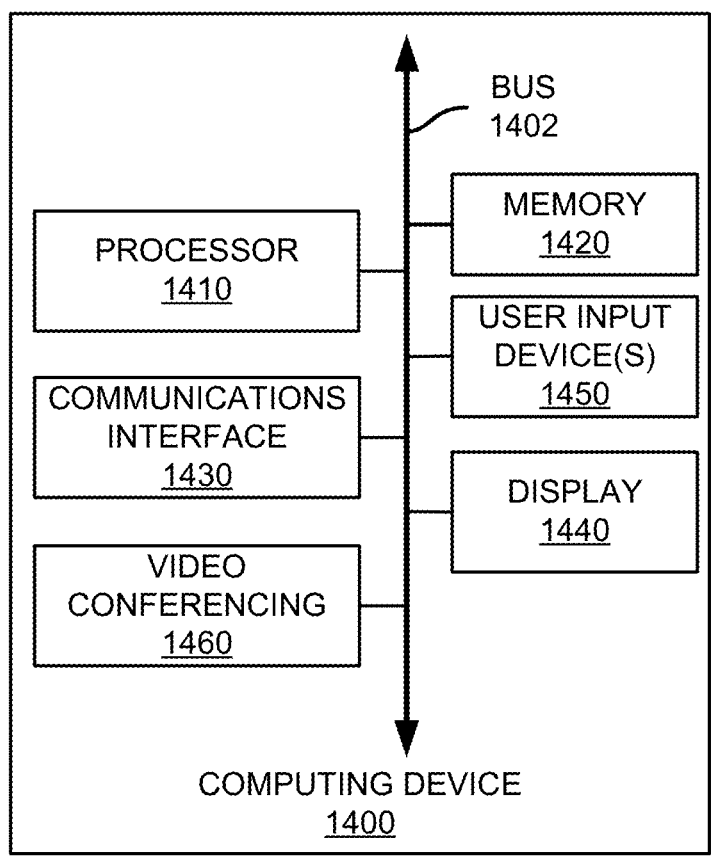
FIG. 14 shows an example computing device suitable for use with example systems and methods for remotely adjusting audio capture during video conferences.

Referring now to FIG. 14, FIG. 14 shows an example computing device 1400 suitable for use in example systems or methods for dynamic context-sensitive virtual backgrounds for video conferences according to this disclosure. The example computing device 1400 includes a processor 1410 which is in communication with the memory 1420 and other components of the computing device 1400 using one or more communications buses 1402. The processor 1410 is configured to execute processor-executable instructions stored in the memory 1420 to perform one or more methods for remotely adjusting audio capture during video conferences according to different examples, such as part or all of the example methods 1100, 1200 described above with respect to FIGS. 11-13. The computing device 1400, in this example, also includes one or more user input devices 1450, such as a keyboard, mouse, touchscreen, microphone, etc., to accept user input. The computing device 1400 also includes a display 1440 to provide visual output to a user.

In addition, the computing device 1400 includes a video conferencing application 1460 to enable a user to join and participate in a video conference, such as a conventional meeting or webinar, by receiving multimedia streams from a video conference provider, sending multimedia streams to the video conference provider, joining and leaving breakout rooms, remotely adjust audio capture, etc. such as described throughout this disclosure, etc.

The computing device 1400 also includes a communications interface 1440. In some examples, the communications interface 1430 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

In addition to the examples discussed above, various aspects of the disclosure may be combined. For example, in a first aspect, a method includes joining, by a first client device, a videoconferencing meeting hosted by a video conference provider, the videoconference meeting including a plurality of participants; providing an audio stream and a video stream to a video conference provider; receiving, from a second client device, an audio focus area associated with a video stream provided the first client device; determining, based on the audio focus area, a bounding region within an environment shown in the video stream; directing a microphone array to capture audio from the bounding region; and providing the captured audio as an audio stream to the video conference provider.

In a second aspect, a method according to the first aspect also includes, wherein the audio focus area identifies a portion of a video frame received from the first client device.

In a third aspect, a method according to the first or second aspect also includes, wherein the audio focus area identifies a person in a video frame received from the first client device.

In a fourth aspect, a method according to any of the first through third aspects also includes determining an audio focus zone within the bounding region; and wherein directing the microphone array comprises directing the microphone array to capture audio from the audio focus zone.

In a fifth aspect, a method according to any of the first through fourth aspects also includes, wherein determining the bounding region within the environment is based on dimensions of a room and a location and orientation of a camera providing the video stream.

In a sixth aspect, a method according to any of the first through fifth aspects also includes, wherein directing the microphone array comprises changing a position or orientation of the microphone array or one or more microphones in the microphone array.

In a seventh aspect, a method according to any of the first through sixth aspects also includes, wherein directing the microphone array comprises changing one or more beamforming parameters of the microphone array.

In an eighth aspect, a method according to any of the first through seventh aspects also includes, wherein the microphone array is a first microphone array, and receiving, from a third client device, a second audio focus area associated with the video stream provided the first client device; determining, based on the second audio focus area, a second bounding region within the environment shown in the video stream; directing a second microphone array to capture second audio from the second bounding region; and providing the captured second audio as a second audio stream to the video conference provider.

In a ninth aspect, a client device includes a communications interface; a non-transitory computer-readable medium; and one or more processors communicatively coupled to the communications interface and the non-transitory computer-readable medium, the one or more processors configured to execute processor-executable instructions stored in the non-transitory computer-readable medium to join a videoconferencing meeting hosted by a video conference provider, the videoconference meeting including a plurality of participants; provide an audio stream and a video stream to a video conference provider; receive, from a client device, an audio focus area associated with a video stream provided the first client device; determine, based on the audio focus area, a bounding region within an environment shown in the video stream; direct a microphone array to capture audio from the bounding region; and provide the captured audio as an audio stream to the video conference provider.

In a tenth aspect, a client device according to the ninth aspect also includes, wherein the audio focus area identifies a portion of a video frame received from the first client device.

In an eleventh aspect, a client device according to the ninth or tenth aspects also includes, wherein the audio focus area identifies a previously received audio focus area.

In an twelfth aspect, a client device according to any of the ninth through eleventh aspects also includes, wherein the one or more processors area configured to execute further processor-executable instructions stored in the non-transitory computer-readable medium to cause the one or more processors to determine an existing bounding region similar to the bounding region, and, determine the existing bounding region as the bounding region.

In an thirteenth aspect, a client device according to any of the ninth through twelfth aspects also includes, wherein the one or more processors area configured to execute further processor-executable instructions stored in the non-transitory computer-readable medium to cause the one or more processors to change one or more beamforming parameters of the microphone array.

In an fourteenth aspect, a client device according to any of the ninth through thirteenth aspects also includes, wherein the microphone array is a first microphone array, and wherein the one or more processors area configured to execute further processor-executable instructions stored in the non-transitory computer-readable medium to cause the one or more processors to receive, from a second client device, a second audio focus area associated with the video stream provided the first client device; determining, based on the second audio focus area, a second bounding region within the environment shown in the video stream; directing a second microphone array to capture second audio from the second bounding region; and providing the captured second audio as a second audio stream to the video conference provider.

In a fifteenth aspect, a non-transitory computer-readable medium comprising processor-executable instructions configured to cause one or more processors to join a videoconferencing meeting hosted by a video conference provider, the videoconference meeting including a plurality of participants; provide an audio stream and a video stream to a video conference provider; receive, from a client device, an audio focus area associated with a video stream provided the first client device; determine, based on the audio focus area, a bounding region within an environment shown in the video stream; direct a microphone array to capture audio from the bounding region; and provide the captured audio as an audio stream to the video conference provider.

In a sixteenth aspect, a non-transitory computer-readable medium according to the fifteenth aspect also includes, wherein the audio focus zone identifies a plurality of portions of a video frame received from the first client device.

In an seventeenth aspect, a non-transitory computer-readable medium according to any of the fifteenth or sixteenth aspects also includes, processor-executable instructions configured to cause the one or more processors to determine the region within the environment based on dimensions of a room and a location and orientation of a camera providing the video stream.

In an eighteenth aspect, a non-transitory computer-readable medium according to any of the fifteenth through seventeenth aspects also includes processor-executable instructions configured to cause the one or more processors to determine an existing bounding region similar to the bounding region, and determine the existing bounding region as the bounding region.

In a nineteenth aspect, a non-transitory computer-readable medium according to any of the fifteenth through eighteenth aspects also includes processor-executable instructions configured to cause the one or more processors to change one or more beamforming parameters of the microphone array.

In a twentieth aspect, a non-transitory computer-readable medium according to any of the fifteenth through nineteenth aspects also includes processor-executable instructions configured to cause the one or more processors to receive, from a second client device, a second audio focus area associated with the video stream provided the first client device; determining, based on the second audio focus area, a second bounding region within the environment shown in the video stream; directing a second microphone array to capture second audio from the second bounding region; and providing the captured second audio as a second audio stream to the video conference provider.

In a twenty-first aspect, a method includes joining a videoconferencing meeting hosted by a video conference provider, the videoconference meeting including a plurality of participants; receiving a selection command, the selection command identifying an audio focus zone associated with an audio stream and a video stream of a first participant using a first client device, the audio focus zone corresponding to a region of an environment in which the first participant is located;

transmitting, to the first client device via the video conference provider, an indication of the audio focus zone; receiving, from the first client device via the video conference provider, a focused audio stream corresponding to the audio focus zone; and outputting the focused audio stream using the audio output device.

In a twenty-second aspect, the method according to the twenty-first aspect also includes, wherein receiving the selection command comprises receiving a selection of a region in the video stream.

In a twenty-third aspect, the method according to the twenty-first or twenty-second aspects also includes, wherein receiving the selection command comprises receiving a selection of a plurality of regions in the video stream.

In a twenty-fourth aspect, the method according to the twenty-first through twenty-third aspects also includes, wherein receiving the selection command comprises receiving a selection of a person in the video stream.

In a twenty-fifth aspect, the method according to the twenty-first through twenty-fourth aspects also includes, wherein transmitting the indication comprises transmitting a selected region in the video stream.

In a twenty-sixth aspect, a client device includes a communications interface; a non-transitory computer-readable medium; and one or more processors communicatively coupled to the communications interface and the non-transitory computer-readable medium, the one or more processors configured to execute processor-executable instructions stored in the non-transitory computer-readable medium to perform the methods of any of the twenty-first through twenty-fifth aspects.

In a twenty-seventh aspect, a non-transitory computer-readable medium comprising processor-executable instructions stored in the non-transitory computer-readable medium to cause one or more processors to perform the methods of any of the twenty-first through twenty-fifth aspects.

In a twenty-eighth aspect, a method includes joining first and second client devices to a videoconference meeting hosted by a video conference provider in response to requests from the first and second client devices to join the video conference meeting, the videoconference meeting including a plurality of participants; receiving audio streams and video streams from the first and second client devices; receiving, from the second client device, an audio focus area associated with the video stream provided by the first client device; determining, based on the audio focus area, a bounding region associated with a bounding region within an environment shown in the video stream; providing the bounding region to the first client device; and receiving a focused audio stream from the first client device, the focused audio stream targeting the bounding region.

In a twenty-ninth aspect, a client device includes a communications interface; a non-transitory computer-readable medium; and one or more processors communicatively coupled to the communications interface and the non-transitory computer-readable medium, the one or more processors configured to execute processor-executable instructions stored in the non-transitory computer-readable medium to perform the method of the twenty-eighth aspect.

In a thirtieth aspect, a non-transitory computer-readable medium comprising processor-executable instructions stored in the non-transitory computer-readable medium to cause one or more processors to perform the method of the twenty-eighth aspect.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
    joining, by a first client device, a videoconferencing meeting hosted by a video conference provider, the videoconference meeting including a plurality of participants;
    providing, by the first client device, an audio stream and a video stream to the video conference provider;

receiving, from a second client device, an audio focus area associated with the video stream provided by the first client device;

determining, by the first client device based on the audio focus area, a bounding region within an environment shown in the video stream;

directing, by the first client device, a microphone array to capture audio from the bounding region; and providing, by the first client device, the captured audio as an audio stream to the video conference provider.

2. The method of claim 1, wherein the audio focus area identifies a portion of a video frame received from the first client device.

3. The method of claim 1, wherein the audio focus area identifies a person in a video frame received from the first client device.

4. The method of claim 1, further comprising:
determining an audio focus zone within the bounding region; and
wherein directing the microphone array comprises directing the microphone array to capture audio from the audio focus zone.

5. The method of claim 1, wherein determining the bounding region within the environment is based on dimensions of a room and a location and orientation of a camera providing the video stream.

6. The method of claim 1, wherein directing the microphone array comprises changing a position or orientation of the microphone array or one or more microphones in the microphone array.

7. The method of claim 1, wherein directing the microphone array comprises changing one or more beamforming parameters of the microphone array.

8. The method of claim 1, wherein the microphone array is a first microphone array, and further comprising:
receiving, from a third client device, a second audio focus area associated with the video stream provided the first client device;
determining, based on the second audio focus area, a second bounding region within the environment shown in the video stream;
directing a second microphone array to capture second audio from the second bounding region; and
providing the captured second audio as a second audio stream to the video conference provider.

9. A client device comprising:
a communications interface;
a non-transitory computer-readable medium; and
one or more processors communicatively coupled to the communications interface and the non-transitory computer-readable medium, the one or more processors configured to execute processor-executable instructions stored in the non-transitory computer-readable medium to cause the one or more processors to:
join a videoconferencing meeting hosted by a video conference provider, the videoconference meeting including a plurality of participants;
provide an audio stream and a video stream to a video conference provider;
receive, from a client device, an audio focus area associated with a video stream provided the client device;
determine, based on the audio focus area, a bounding region within an environment shown in the video stream;
direct a microphone array to capture audio from the bounding region; and
provide the captured audio as an audio stream to the video conference provider.

10. The client device of claim 9, wherein the audio focus area identifies a portion of a video frame provided the client device.

11. The client device of claim 9, wherein the audio focus area identifies a previously received audio focus area.

12. The client device of claim 9, wherein the one or more processors are configured to execute further processor-executable instructions stored in the non-transitory computer-readable medium to cause the one or more processors to:
determine an existing bounding region similar to the bounding region, and,
determine the existing bounding region as the bounding region.

13. The client device of claim 9, wherein the one or more processors are configured to execute further processor-executable instructions stored in the non-transitory computer-readable medium to cause the one or more processors to change one or more beamforming parameters of the microphone array.

14. The client device of claim 9, wherein the microphone array is a first microphone array, and wherein the one or more processors are configured to execute further processor-executable instructions stored in the non-transitory computer-readable medium to cause the one or more processors to:
receive, from a second client device, a second audio focus area associated with the video stream provided the client device;
determining, based on the second audio focus area, a second bounding region within the environment shown in the video stream;
directing a second microphone array to capture second audio from the second bounding region; and
providing the captured second audio as a second audio stream to the video conference provider.

15. A non-transitory computer-readable medium comprising processor-executable instructions configured to cause one or more processors to:
join, by a client device, a videoconferencing meeting hosted by a video conference provider, the videoconference meeting including a plurality of participants;
provide an audio stream and a video stream to a video conference provider;
receive, from a second client device, an audio focus area associated with a video stream provided the client device;
determine, based on the audio focus area, a bounding region within an environment shown in the video stream;
direct a microphone array to capture audio from the bounding region; and
provide the captured audio as an audio stream to the video conference provider.

16. The non-transitory computer-readable medium of claim 15, wherein the audio focus area identifies a plurality of portions of a video frame provided by the client device.

17. The non-transitory computer-readable medium of claim 15, further comprising processor-executable instructions configured to cause the one or more processors to determining the region within the environment based on dimensions of a room and a location and orientation of a camera providing the video stream.

18. The non-transitory computer-readable medium of claim 15, further comprising processor-executable instructions configured to cause the one or more processors to:
   determine an existing bounding region similar to the bounding region, and,
   determine the existing bounding region as the bounding region.

19. The non-transitory computer-readable medium of claim 15, further comprising processor-executable instructions configured to cause the one or more processors to change one or more beamforming parameters of the microphone array.

20. The non-transitory computer-readable medium of claim 15, wherein the microphone array is a first microphone array, and further comprising processor-executable instructions configured to cause the one or more processors to:
   receive, from a third client device, a second audio focus area associated with the video stream provided the client device;
   determining, based on the second audio focus area, a second bounding region within the environment shown in the video stream;
   directing a second microphone array to capture second audio from the second bounding region; and
   providing the captured second audio as a second audio stream to the video conference provider.

* * * * *